US007881713B2

United States Patent
Hale et al.

(10) Patent No.: US 7,881,713 B2
(45) Date of Patent: *Feb. 1, 2011

(54) SYSTEM AND METHOD OF WIRELESSLY TRIGGERING PORTABLE DEVICES

(75) Inventors: Gregory Brooks Hale, Orlando, FL (US); Reynold Duane Green, Orlando, FL (US); Harold Andrew McLaughlin, Orlando, FL (US); William George Wiedefeld, Clermont, FL (US); Phu Van Nguyen, Orlando, FL (US)

(73) Assignee: Disney Enterprises, Inc., Burbank, CA (US)

( * ) Notice: Subject to any disclaimer, the term of this patent is extended or adjusted under 35 U.S.C. 154(b) by 743 days.

This patent is subject to a terminal disclaimer.

(21) Appl. No.: 11/679,147

(22) Filed: Feb. 26, 2007

(65) Prior Publication Data
US 2007/0274685 A1 Nov. 29, 2007

Related U.S. Application Data

(63) Continuation of application No. 10/897,251, filed on Jul. 21, 2004, now Pat. No. 7,224,967, which is a continuation of application No. 10/314,070, filed on Dec. 5, 2002, now Pat. No. 6,785,539.

(60) Provisional application No. 60/338,798, filed on Dec. 5, 2001.

(51) Int. Cl.
*H04W 24/00* (2009.01)
*H04W 4/00* (2009.01)

(52) U.S. Cl. .................. 455/422.1; 455/456.1; 455/41.2

(58) Field of Classification Search .............. 455/422.1, 455/41.2, 424, 425, 456.1, 456.2, 456.3, 455/39, 414.2
See application file for complete search history.

(56) References Cited

U.S. PATENT DOCUMENTS 3,934,202 A 1/1976 Missale (Continued)

FOREIGN PATENT DOCUMENTS

EP 0132234 1/1985

(Continued)

OTHER PUBLICATIONS

English translation of Office Action dated Jul. 18, 2008, from related Japanese Application No. 2003-550387.

(Continued)

*Primary Examiner*—Sonny Trinh
(74) *Attorney, Agent, or Firm*—Greenberg Traurig, LLP

(57) ABSTRACT

The present invention provides for a system and method of wirelessly triggering portable devices to provide a user with audio and/or visual information related to a show or attraction, for example, or for the purposes of captioning, language translation, assistive listening, and descriptive audio. As a person moves about a venue, a portable device receives signals from transmitters at venue locations. Transmissions may be via infrared or radio signals. The receiving device decodes each signal as a venue location, event time, or device trigger. The receiving device processes the signal and its memory to start a presentation on the device. The portable device memory contains audio, text, graphics, and/or visual content; device playback may contain one or many of these stored contents. The stored content may be synchronized with the user's location, time of travel, time of day, time of a show, or an event in a show. Stored content may be in one or many languages. Presentation of stored content on the portable device may also be altered by user preference, stored logic constraints, automatic learning of user behavior, or user interaction with other devices.

11 Claims, 14 Drawing Sheets

U.S. PATENT DOCUMENTS

| | | | |
|---|---|---|---|
| 3,941,930 A | 3/1976 | Mohri et al. | |
| 4,163,123 A | 7/1979 | Brodsky et al. | |
| 5,152,003 A | 9/1992 | Poch | |
| 5,461,371 A | 10/1995 | Matsumoto et al. | |
| 5,493,281 A | 2/1996 | Owens | |
| 5,596,648 A | 1/1997 | Fast | |
| 5,642,426 A | 6/1997 | Neuman et al. | |
| 5,648,789 A | 7/1997 | Beadles et al. | |
| 5,691,737 A | 11/1997 | Ito et al. | |
| 5,732,326 A * | 3/1998 | Maruyama et al. | 455/66.1 |
| 5,796,351 A | 8/1998 | Yabuki | |
| 5,797,125 A | 8/1998 | Hirohama | |
| 5,850,610 A * | 12/1998 | Testani et al. | 455/512 |
| 5,852,506 A * | 12/1998 | Testani et al. | 398/1 |
| 5,854,844 A | 12/1998 | Sedley | |
| 5,896,215 A | 4/1999 | Cecil et al. | |
| 5,929,848 A * | 7/1999 | Albukerk et al. | 715/700 |
| 5,931,908 A | 8/1999 | Gerba et al. | |
| 5,937,331 A | 8/1999 | Kalluri et al. | |
| 6,005,536 A | 12/1999 | Beadles et al. | |
| 6,169,498 B1 * | 1/2001 | King et al. | 340/686.1 |
| 6,356,956 B1 | 3/2002 | Deo et al. | |
| 6,477,542 B1 | 11/2002 | Papaioannou | |
| 6,484,011 B1 | 11/2002 | Thompson et al. | |
| 6,658,232 B1 | 12/2003 | Johnson | |
| 7,062,778 B1 * | 6/2006 | Pattersson | 725/46 |
| 7,358,959 B2 * | 4/2008 | Fitzsimmons, Jr. | 345/169 |
| 2001/0013002 A1 | 8/2001 | Murai | |

FOREIGN PATENT DOCUMENTS

| | | |
|---|---|---|
| JP | 2001-292084 | 10/2001 |
| JP | 2002-026480 | 1/2002 |
| WO | WO9427206 | 11/1994 |

OTHER PUBLICATIONS

International Search Report and Written Opinion, dated Sep. 25, 2003, from related application PCT/US2002/039256.

Rekimoto, "Research Trend of Real World Oriented Interface", Computer Software, Japan, Japan Society for Software Science and Technology, May 15, 1996, vol. 13, No. 3, pp. 4 to 18.

Supplementary European Search Report from related European Patent Application No. EP02797232, dated Dec. 17, 2009.

* cited by examiner

SYSTEM AND METHOD OF WIRELESSLY TRIGGERING PORTABLE DEVICES

RELATED APPLICATIONS

This is a continuation of application Ser. No. 10/897,251, filed on Jul. 21, 2004, which is a continuation of application Ser. No. 10/314,070 filed on Dec. 5, 2002, which claims the benefit of U.S. Provisional Patent Application No. 60/338,798 filed on Dec. 5, 2001, the contents of which are incorporated by reference herein in their entirety.

BACKGROUND

1. Field of the Invention

The present invention relates generally to systems and methods of providing synchronized information such as narratives, translations or other show related messages to individual patrons of rides, shows and exhibits.

2. General Background and State of the Art

There are several circumstances that may interfere with a person's ability to hear, and thereby interfere with a presentation of information to the listener. For example, persons with hearing loss may miss narratives, sound effects, music and other sound material related to the presentation, and messages in live performances, films, television and special events. Persons who do not speak the language or languages used in the presentation may miss narratives and other related messages that are presented. The language barrier prevents many people from different cultures and languages from understanding, participating or interacting with the information being presented. Background environmental noise may also affect a person's ability to hear, and thereby diminish the effect of the presentation. Persons with severely impaired vision also miss visual portions of these presentations.

Captioning systems have been used in venues including museums, theaters and other auditoriums to provide foreign language translation or captioning for the hearing impaired. The most common of these systems includes "open captioning" whereby text is displayed on a projection surface or large adjacent display area where the entire audience can see the captioning. Another common method of captioning is "reflective captioning" which uses a transparent but reflective panel to display the text from a rear projection while allowing the viewer to see the display or performance through the panel. Yet another method utilizes individual hard-wired displays located in the back of a seat in front of the viewer.

Multiple channel assistive listening systems have also been used in venues including theaters, churches and auditoriums to provide amplified narration and foreign language translation. These systems have the content broadcast by infrared, radio frequency or inductive loops to the devices carried by the patrons. In these cases, the content is continuously streamed with the content source being located in the facility; the receiver simply played back the audio as it was received. In those instances where more than one language is provided, the multiple transmission frequencies sometimes cause interference with each other (crosstalk). The available number of suitable frequencies also limits the number of channels. Radio frequency and inductive loop technologies can also cause interference with other electronic equipment within the venue. Personal audio devices have also been used in venues including museums to provide narration in multiple languages. These are typically manually activated systems where the patron is required to activate the system, either by pressing a button or manually entering a numeric code.

Each of these systems has its own limitations. For example, open captioning can be obtrusive and distracting to other patrons. These systems are generally not convenient to the user and are limited to one or a few languages.

Moving ride vehicles in a venue such as an amusement park present an additional set of problems in providing captioning due to such factors as variations in vehicle speed, and lack of communications wiring to moving vehicles.

Additionally, presentations often could be made more effective if they included a method to provide interactivity between the audience and the presenter(s).

SUMMARY

It is therefore an object of the present invention to provide a convenient system and method of presenting audio and/or visual information for the purposes of captioning, language translation, assistive listening, and descriptive audio to individual patrons of rides, meeting areas, pathways, shows and exhibits without using intrusive open captioning or hard wired individual display systems. The present invention preferably makes use of infrared (IR) or radio frequency (RF) signals to wirelessly trigger portable devices.

Wireless transmitters are installed at various locations including waypoints, signs, display areas, entrances, exits, and theater seating areas. The transmitters are configured to send short messages, or codes, corresponding to waypoint location, type of sign, show time, time of day, etc. The transmitters may be freestanding transmitters that repeatedly transmit stored messages, or the transmitters may send data from other equipment such as computers, show controllers, devices with processors or controllers, other transmitters, etc. The transmitters may cover a large area such as a theater, or be precisely directed to cover a small area.

Guests carry portable devices loaded with content information such as location descriptions, sign contents, show content, alternate language content, event times, etc. Content may be audio, graphical, or a combination of both.

When the device is within range of a transmitter sending codes, the device should be capable of receiving codes. Upon receiving a code, the device searches its memory for appropriate content, tests any logic constraints, and presents content to the user. Logic can be based on user preferences, time of day, time of event, locations of transmitters visited, time of visits, sequence of transmitters visited, intended device type, etc.

All portable devices have the common elements of receiver, processor, memory, and power source. Other elements of the devices vary depending on intended applications. A portable captioning unit may have a display. A display, as used herein, may be defined as a visual display for text or graphics, or for audio information. For example, a portable audio device has an audio amplifier with speaker or earpiece. A portable captioning unit may have a visual display. Other devices may have both audio capability as well as a visual display, and further may have user input capabilities. Portable devices may also have transmitters for communication with other portable devices, with system docking stations, with receivers in shows or attractions, etc. Portable devices may have IR receivers, RF receivers, or both. Portable devices similarly may have IR transmitters, RF transmitters, or both.

Content information may be loaded into the portable device memory at any time prior to its use. A bulk storage device may be attached to the portable device, the portable device memory contents may be received via a docking station data interface, or content may be streamed into portable device memory via its wireless receiver. Examples of bulk storage are flash memory cards, micro-drives, hard drives, CD-ROM disks, etc.

Content may be loaded into a portable device by connecting a cable, or plugging the device into a cradle or docking station having a connector. Examples of docking station data interfaces are Ethernet-based serial, RS-232 based serial, IRDA infrared serial, etc. It is possible to provide docking stations at numerous locations available to the portable device user. It is also possible to provide large, multi-unit docking stations that load many portable devices simultaneously. A docking station may connect to a freestanding storage device, or may be linked to one or many remote content sources via a communications network. The network could include a local area network (LAN), Internet connection, satellite link, etc. The content could also be streamed to a device using a wireless network. For example, streamed content could be loaded at a theater to send blocks of caption text to portable units shortly before sending text synchronizing commands; the content is buffered in portable device memory shortly before its presentation.

One such system could use high-speed RF transceivers to transfer content to portable devices, while using an IR system to precisely aim location synchronizing codes to the portable device. It is also possible for a portable device to automatically request content download; as a user travels to a new area with a portable device and receives location codes for which it has no content, the device may transmit a request for new content. Such a content delivery system may connect to a freestanding storage device, or may be linked to one or many remote content sources via a communications network. The network could include a local area network (LAN), Internet connection, satellite link, etc.

In one embodiment of the present invention, text captions are synchronized with a theater presentation. A portable device with a text display receives time codes from a theater transmitter. Caption text for the entire theater presentation is stored in the device. The device receives the transmitter signals, extracts the current show time, and displays the appropriate text in time with the show.

In another embodiment of the present invention, a personal audio device receives location codes from transmitters mounted along a travel route. Transmitters are located at significant locations along the travel route; transmission coverage at each location is restricted. As the user nears a location, the device receives the transmitter signals, searches its memory for matching audio content, and plays the audio.

In yet a further embodiment of the present invention, a device plays speech translated into the user's language. The theater transmitter sends time codes during the theater presentation. The device memory contains show speech content recorded in the user's language. The receiver in the device extracts the current show time, and plays the matching speech. The received time codes will synchronize show speech even if the user has entered the theater mid-show.

The system and method of the present invention is designed for use in a wide variety of locations. For example, the present invention is suitable for a theme park that contains a large number of different attractions covering a large area and receives a large number of visitors, including tourists who may not speak the native language or visitors with specials needs due to audio or visual impairment. The invention could also be used in theaters, museums, shopping malls, exhibit halls, convention centers, meeting areas, walkways or roadways, and a wide variety of other locations.

BRIEF DESCRIPTION OF THE DRAWINGS

FIGS. 10-1 to 10-3 are a flow diagram in accordance with the teachings of the present invention.

DETAILED DESCRIPTION OF THE PREFERRED EMBODIMENTS

Figure 1:
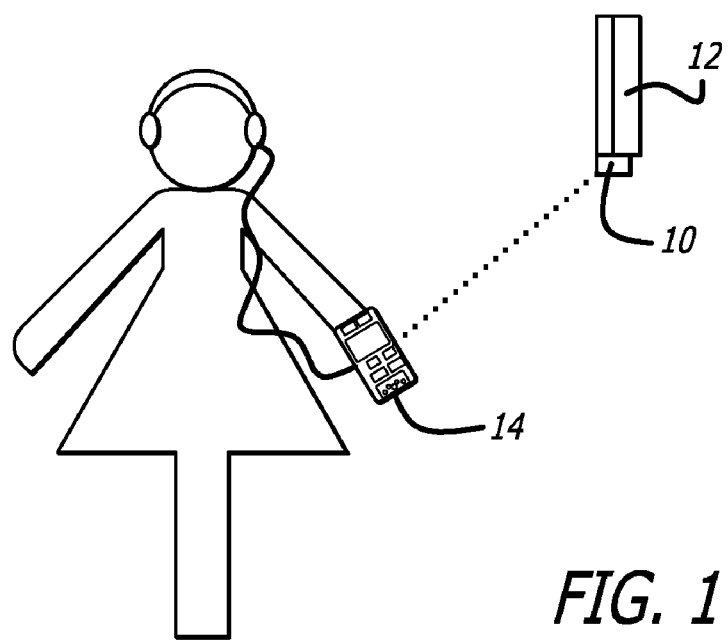
FIG. 1 is a diagram showing triggering of a personal device for a static sign or display.

Referring more particularly to the drawings, one embodiment of the present invention is illustrated in FIG. 1. In this particular embodiment, a portable device is triggered by a static location. Wireless transmitter 10 is placed at a static location 12 such as a sign, display, entrance, or exit area. The transmitter 10 is configured to transmit a location code corresponding to its location for identification purposes. A patron carries a portable device 14 that has a wireless communications port capable of receiving the location code from transmitter 10 and processing this location code. The portable device 14 is capable of displaying text or graphics and/or playing audio. The personal device 14 has a memory that is programmed with audio or visual content data relating to the location. When the patron is within range of transmitter 10, personal device 14 receives the location code. The device 14 is automatically triggered to play narratives, translations or other related material.

For example, the device 14 may be a personal audio device that plays descriptive audio for the blind. The device may also show text and graphics, and play narratives for the hearing impaired. The invention can also be used for language translation of a sign, menu, or other text display. The transmitter sends a location code that triggers the device 14 to display the appropriate text in the language preprogrammed into the device memory. In yet a further embodiment of the present invention, the device plays a speech translation in the user's language.

Figure 2:
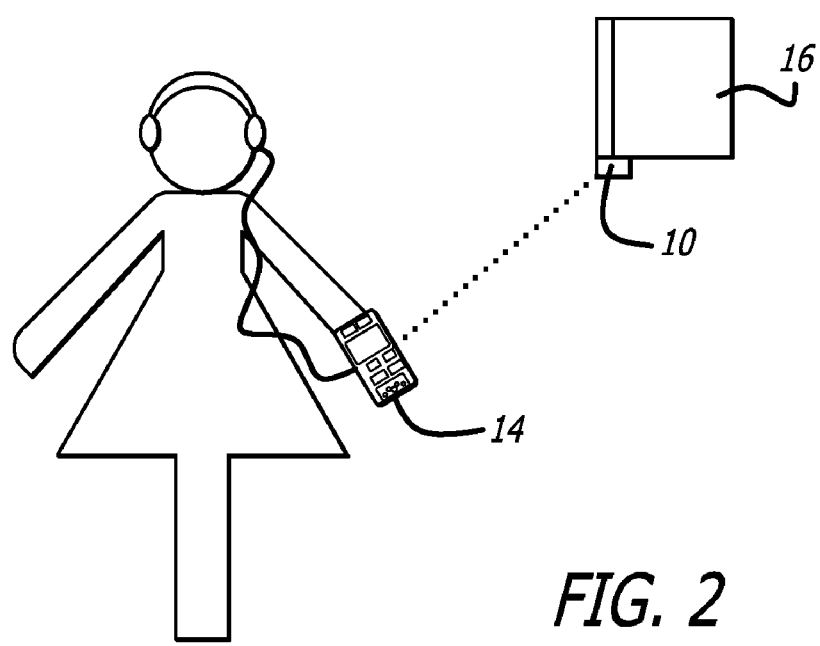
FIG. 2 is a schematic that shows triggering of a portable device for dynamic displays.

FIG. 2 illustrates another embodiment of the present invention wherein a wireless transmitter 10 triggers a portable device 14 based on both location and time. For example, it may be necessary to synchronize information with a dynamic display 16, such as a video monitor located in a theme park. In this particular embodiment, wireless transmitter 10 is placed at a location where a dynamic display 16 is present. The transmitter 10 is configured to transmit a location code corresponding to its location as well as time codes for synchronization purposes. The portable device 14 is then triggered to display text or play audio in time with the dynamic presentation or display 16.

For example, a guest carrying a portable device 14 in accordance with the present invention arrives at a location where a dynamic display 16 is present. This may include a video monitor, a scripted live presentation, an animatronic show, etc. A wireless transmitter 10 is programmed to send codes identifying the location and the show time. The show time may be the amount of time into, or from the start of the show or presentation. Based on the code received, the device recognizes when to start playing its content so it is synchronous with the show or presentation. The guest does not need to wait for the beginning of the next show.

Figure 3:
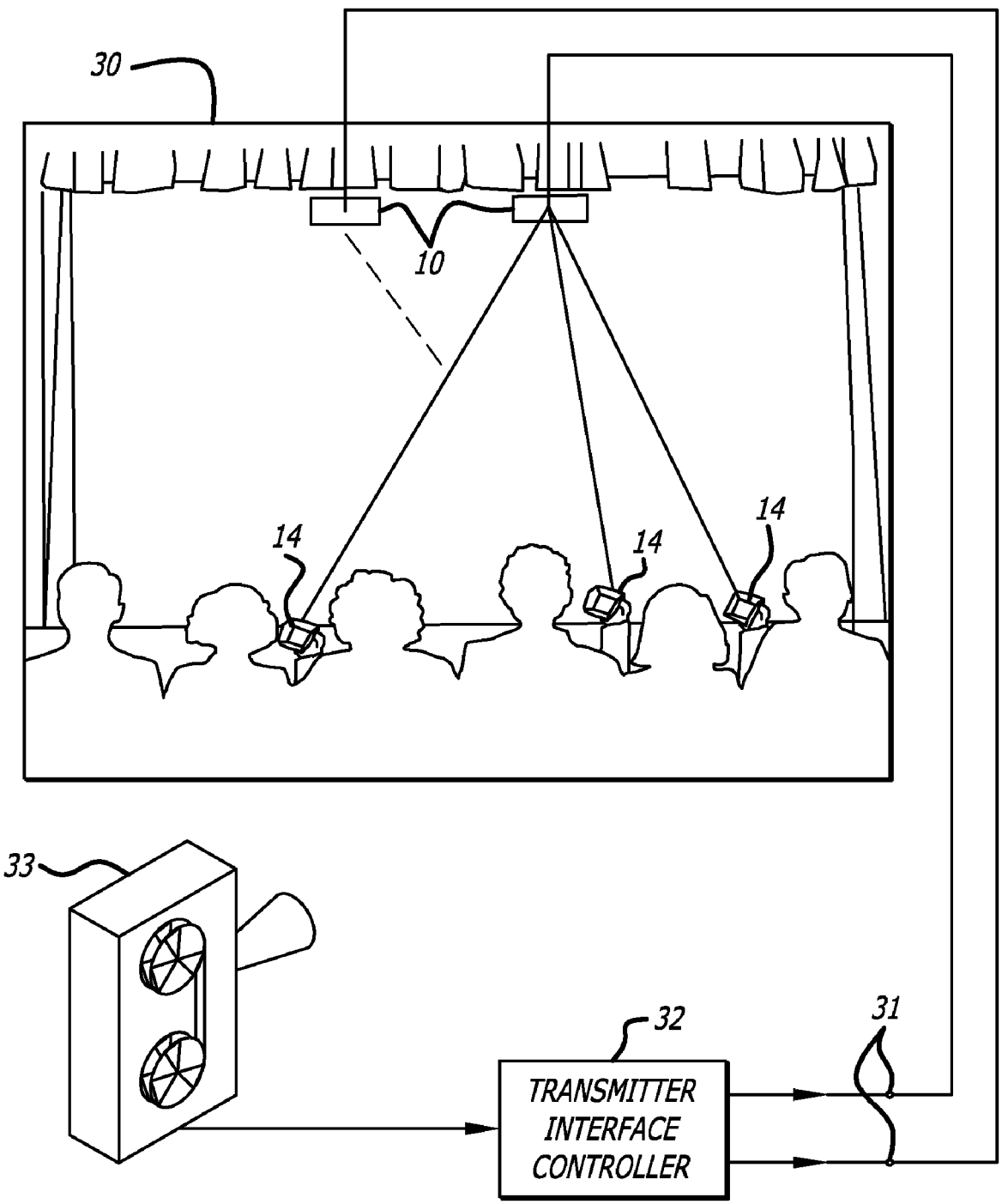
FIG. 3 is a schematic that shows triggering of a portable device for presentations.

Similarly, FIG. 3 illustrates another embodiment of the present invention wherein text captions are synchronized with a theater presentation. Patrons of a theater 30 are given a portable captioning device 14 with a screen for displaying text and/or graphics. The theater seats may optionally provide a resting place for the device if desired by the patron. The portable device receives time codes from a wireless transmitter 10 located in the theater 30. Caption text for the entire theater presentation is stored in the memory of device 14. Portable device 14 receives the codes sent by the transmitter, extracts the current show time, and displays the appropriate text in time with the show. In a stationary venue, the transmitters may transmit a synchronization code that triggers the device to display the appropriate captioning in synchronization with the audio track.

In one embodiment, transmitters 10 are sent time codes in data packets 31 from an interface controller 32. The interface controller reads time prompts off of a film projector or show controller 33. The interface controller has the capability to direct the data packets to different transmitters as is necessary. In another embodiment, it is anticipated that a digital projector may be used in the theater. In this case, there may be no need for a separate interface controller to read time prompts from the projector. The digital projector may recognize time prompts and directly transmit to the transmitters.

In yet a further embodiment of the present invention, a device plays speech translated into the user's language. The theater transmitter sends time codes during the theater presentation in the same way as described above. The device memory contains show speech content recorded in the user's language. The receiver in the device extracts the current show time, and plays the matching speech. The received time codes will synchronize show speech even if the user has entered the theater in mid-show.

Figure 4:
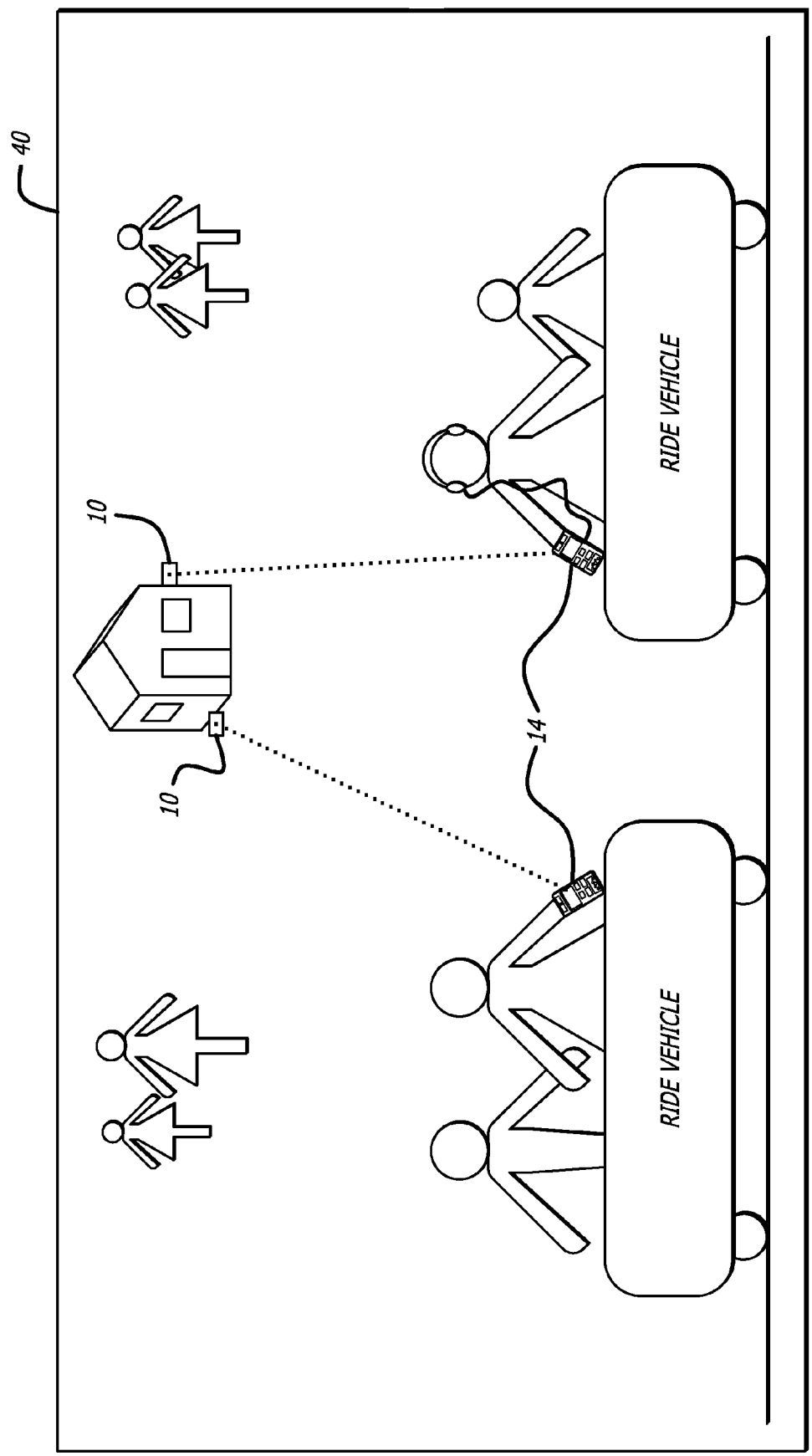
FIG. 4 is a schematic that shows triggering of a portable device on a ride system or travel route.

FIG. 4 shows yet another embodiment of the present invention wherein personal devices 14 are triggered on a moving ride system 40. The transmitters 10 send location codes that trigger the device 14 to display the appropriate captioning as the ride vehicle enters each specific area or 'scene'. In another embodiment of the present invention, a portable device 14 receives location codes from transmitters mounted along a travel route. Transmitters are located at significant locations along the travel route. The transmission coverage at each location is restricted so that there is no overlap. As the user nears a location, the device receives the transmitter signals, searches its memory for matching content, and presents content to the user.

Minimally, the hardware requirements of a system of the present invention include: a portable audio/visual device with sufficient internal memory to allow storage of all data to be played, a wireless communications port such as an infrared port for receiving the trigger signal, and a wireless transmitter system such as infrared or radio frequency, to trigger the device.

Figure 5:
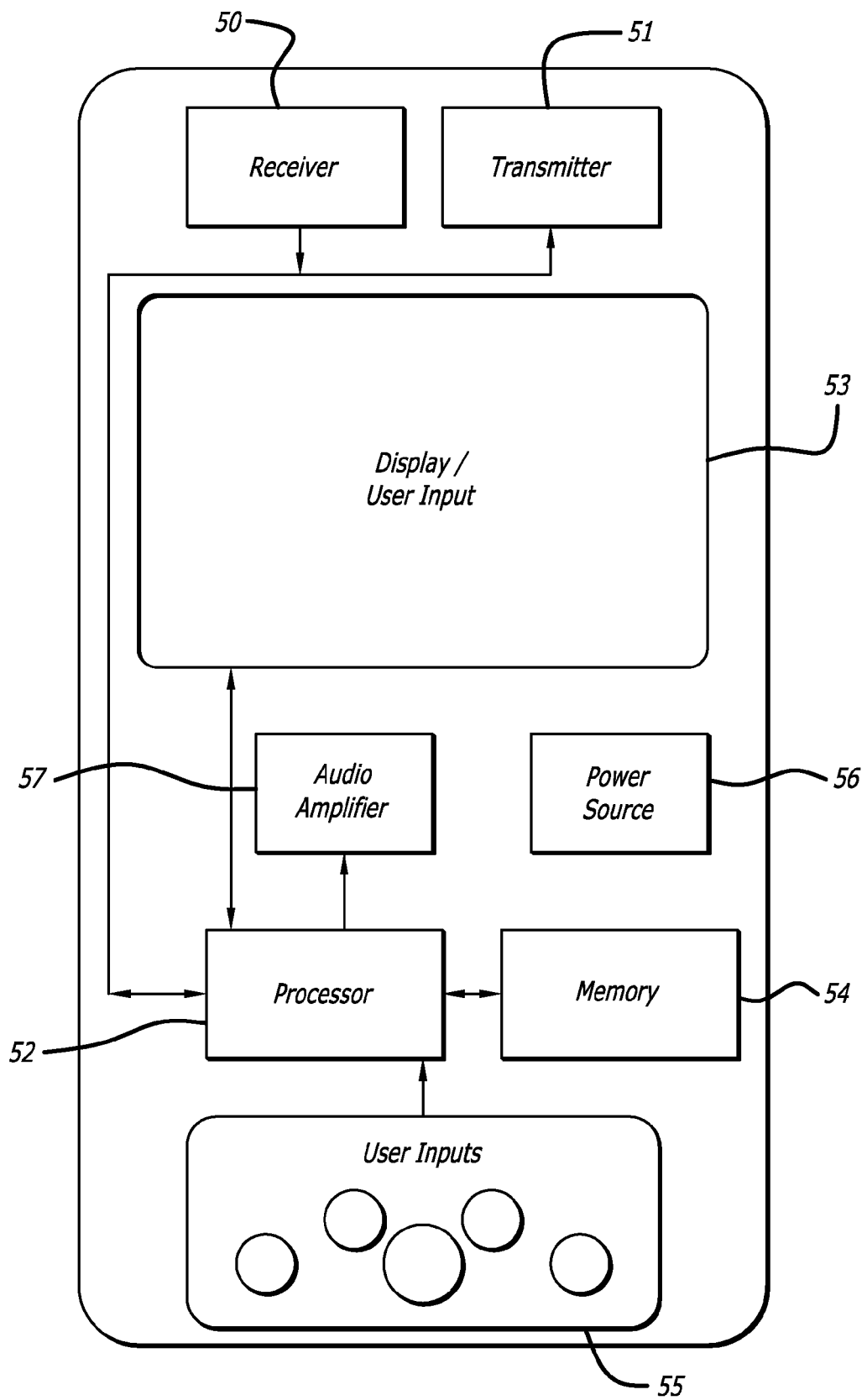
FIG. 5 is an exemplary embodiment of the portable device in accordance with the present invention.

FIG. 5 illustrates an exemplary embodiment of a portable device in accordance with the present invention. All portable devices have the common elements of receiver 50, processor 52, memory 54, and power source 56. Other elements of the devices vary depending on intended applications. In this exemplary embodiment, the portable device has both a display 53 for displaying text and/or graphics, in addition to an audio amplifier 57 for playing sounds, which may be in the form of speech or musical tones. Memory 54 is where the data is stored on the device. The receiver 50 receives a code from the wireless transmitter, and processor 52 analyzes the code. The processor 52 interprets the code to determine how to handle it. If the code is intended for that device, the device searches its memory 54 for content corresponding to the code. The content is then displayed on display 53 and/or plays sound through the audio amplifier 57. The portable device may also have transmitter 51 which may be used to send an interactive code or packet to trigger action in another handheld device, a show device, a networked receiver, etc. The portable device shown in FIG. 5 also shows user inputs 55, such as pushbuttons, which may be used for interactive applications.

Figure 5A:
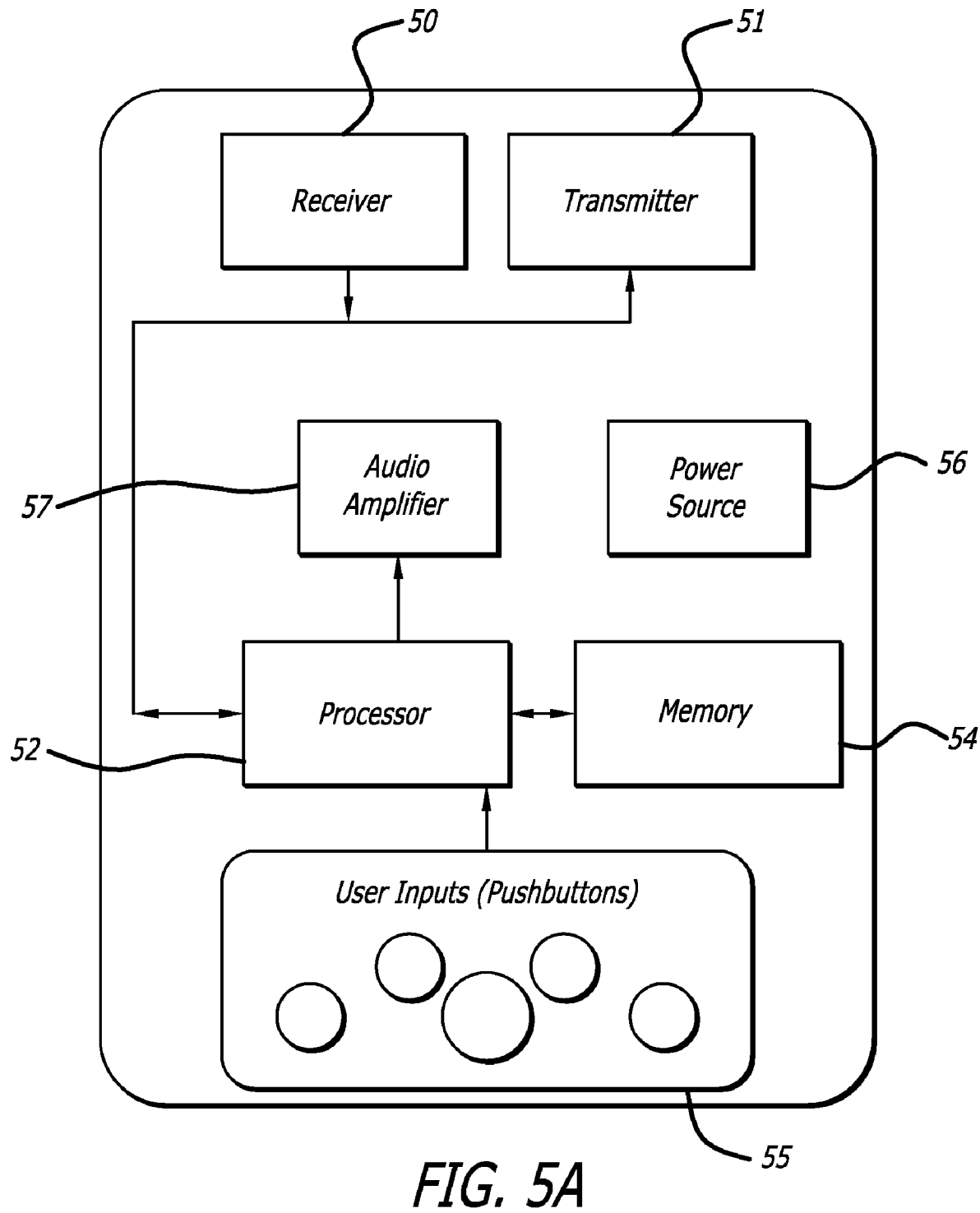
FIG. 5a is a block diagram of a portable audio device in accordance with the present invention.
Figure 5B:
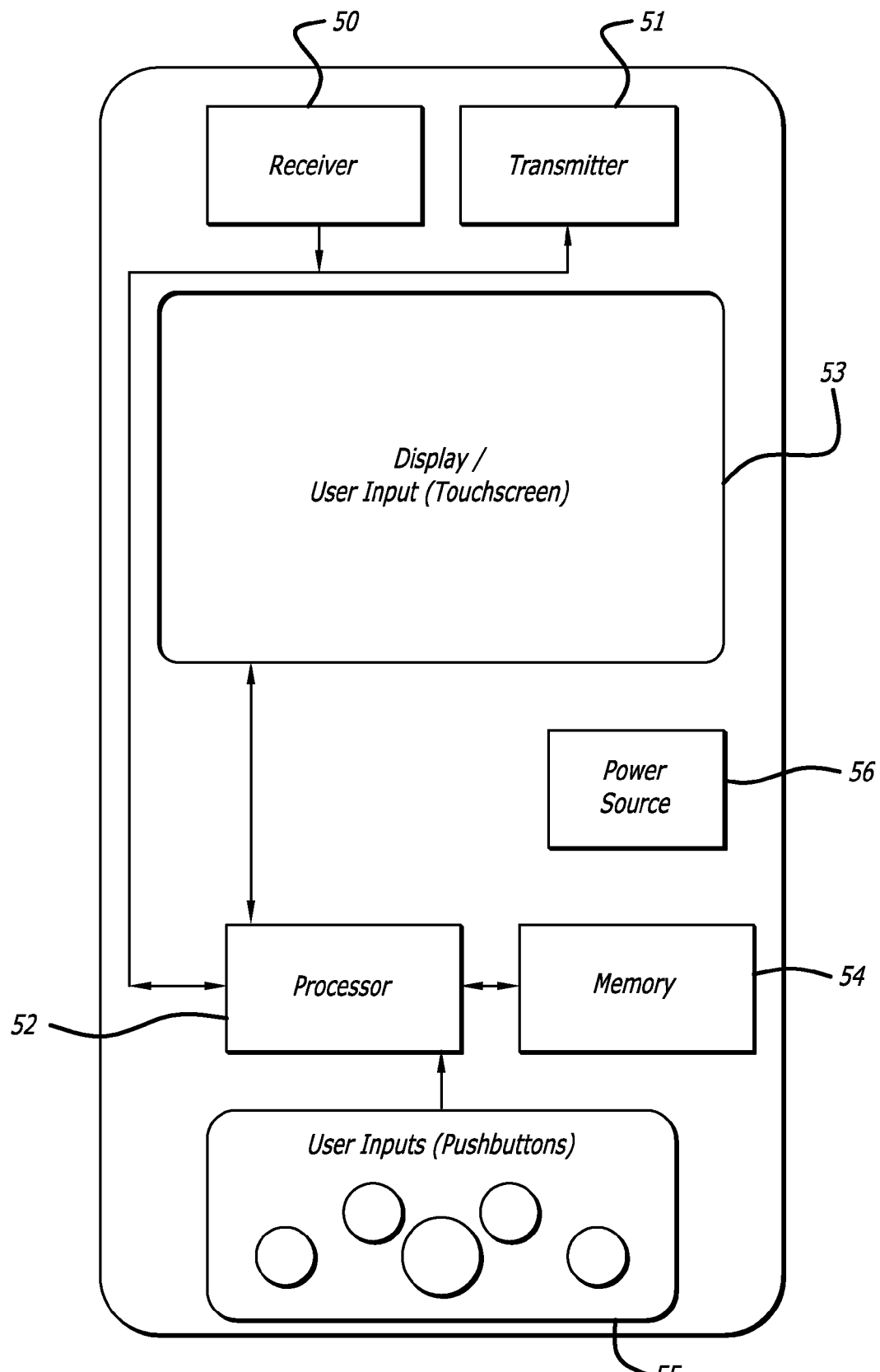
FIG. 5b is a block diagram of a portable captioning device in accordance with the present invention.

FIGS. 5*a* and 5*b* illustrate alternative embodiments of portable devices in accordance with the present invention. FIG. 5*a* shows a portable captioning device. FIG. 5*b* illustrates a portable audio device. These portable devices both have the common elements of receiver 50, processor 52, memory 54, and power source 56, as mentioned above. A portable audio device has, for example, an audio amplifier 51 with speaker or earpiece. A portable captioning unit may have a display 53. The portable device may have both audio output capability as well as a visual display. The portable device may preferably include back lighting of the captioning or illuminated text to allow reading in a darkened environment as would be typical of a theater or an amusement park 'dark ride'. The portable device may also include some type of user input such as pushbuttons.

In an exemplary embodiment, the portable device could be a personal digital assistant (PDA) such as the Compaq IPAQ or similar handheld with a wireless communications receiver. The receiver may act as a modification to existing devices that store and display text information.

The system of the present invention often consists of a network of transmitters, all with different functionalities, as has been described thus far. For example, some transmitters are programmed to send only location-based codes, and other transmitters must be programmed to send both location-based, and time-based codes.

Figure 6:
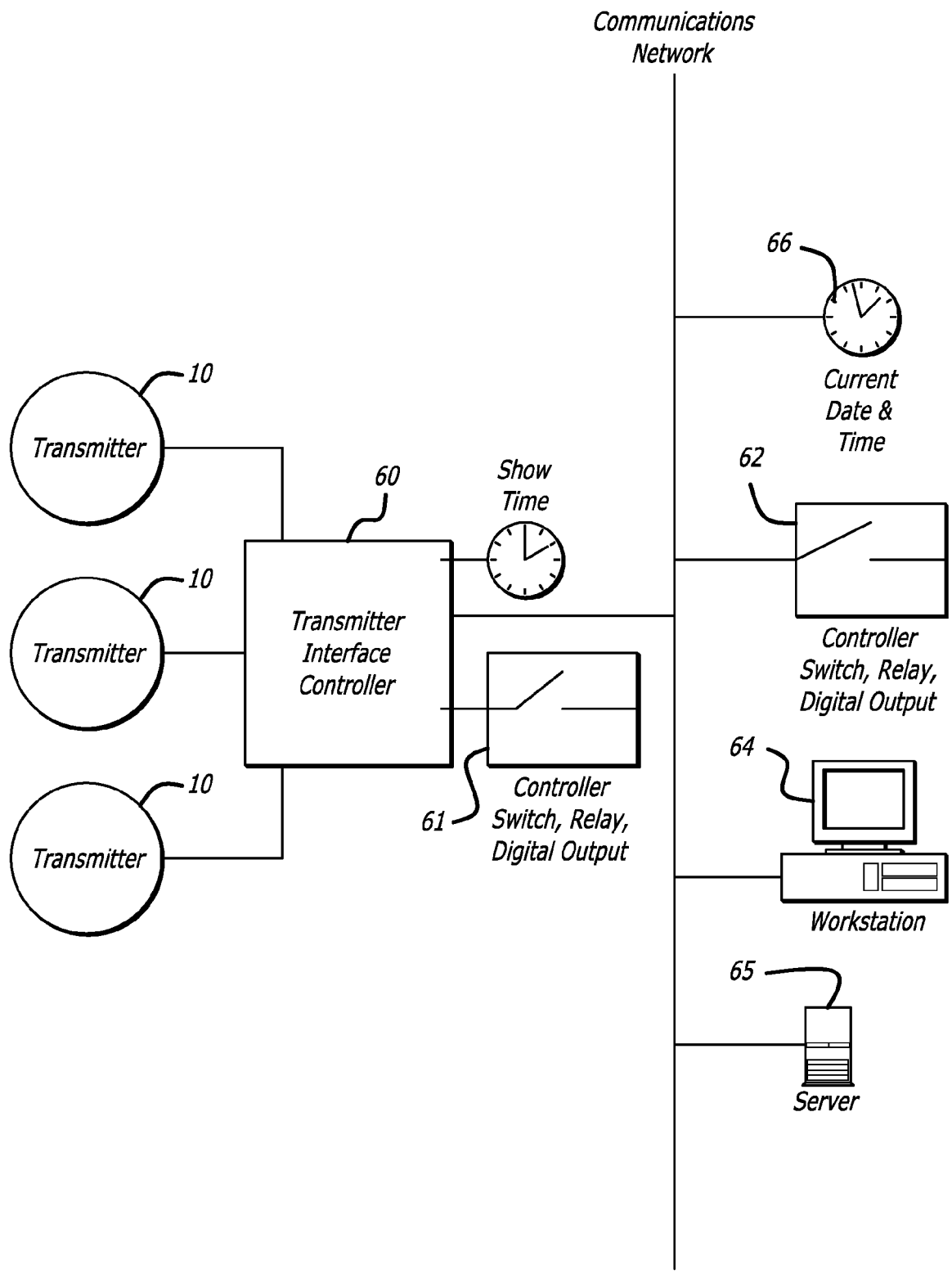
FIG. 6 is a diagram of an exemplary embodiment of the system of the present invention.

A networked transmitter system in accordance with the present invention is illustrated in FIG. 6. In a theme park, a visitor carrying a portable device in accordance with the present invention will most likely encounter a large number of transmitters at various locations in one day. Each wireless transmitter 10 can be operated as a freestanding unit, a switch selectable unit, or be driven from an external controller.

A freestanding unit requires only a power source, and continuously transmits data that has been previously programmed in its non-volatile memory. A freestanding unit may be programmed by a controller, a computer, a portable device, or may be programmed at assembly. In this case, a freestanding transmitter broadcasts the same data packets, or codes, continuously.

A switch selectable transmitter alternatively utilizes a switch or keypad input connected to the transmitter's digital inputs to select different data to be continuously transmitted.

Another mode of operation uses either hard-wired or wireless serial ports in the transmitter to receive data from external controllers, computers, other transmitters, etc. This allows a transmitter to receive continuously varying data (such as show times), format the data, and transmit data packets to the portable devices. For example, FIG. 6 shows controller 62, workstation 64, server 65, and time clock 66, all located on a communications network. Any one of the controller 62, workstation 64, server 65 can control the data that is sent from a transmitter. In one implementation, the interface controller 60 may receive time codes from show controller 61; for example, controller 61 may provide synchronizing time codes such as longitudinal time code (LTC), film frame markers, or proprietary schemes. In another implementation, the controller 61 may send a digital start pulse or close a switch to indicate the beginning of its presentation; this signal would synchronize a free-running clock in the interface controller 60. In another implementation, a controller 62 may be connected to automatic equipment or an operator switch panel at a remote location; a switch or output would trigger the interface controller 60 to send one of many stored codes, or to synchronize its free-running clock. In another implementation, an operator may use workstation 64 to send a command to interface controller 60; this might cause a code to be immediately sent via transmitters 10, or could queue codes for later transmission by interface controller 60 and transmitters 10. In another implementation, server 65 and interface controller 60 may exchange information.

In other implementations, server 65 and interface controller 60 may exchange information. Interface controller 60 may request information from server 65 periodically, for example times of shows or building opening times. Alternatively, server 65 may push information to one or many interface controllers 60. In another implementation, transmitters 10 may send status and fault information to interface controller 60, which then communicates with workstation 64 or server 65; this allows operators to view status and detect faults from remote locations.

By placing one transmitter in range of another transmitter, the second transmitter, by receiving wireless data, can act a repeater for the first. By doing this, transmitter coverage area may be increased without wires connected between transmitters. This principle may be used with two, three, or more transmitters acting as repeaters. A transmitter address embedded in the wireless serial data packet may define the destination transmitter.

Figure 7:
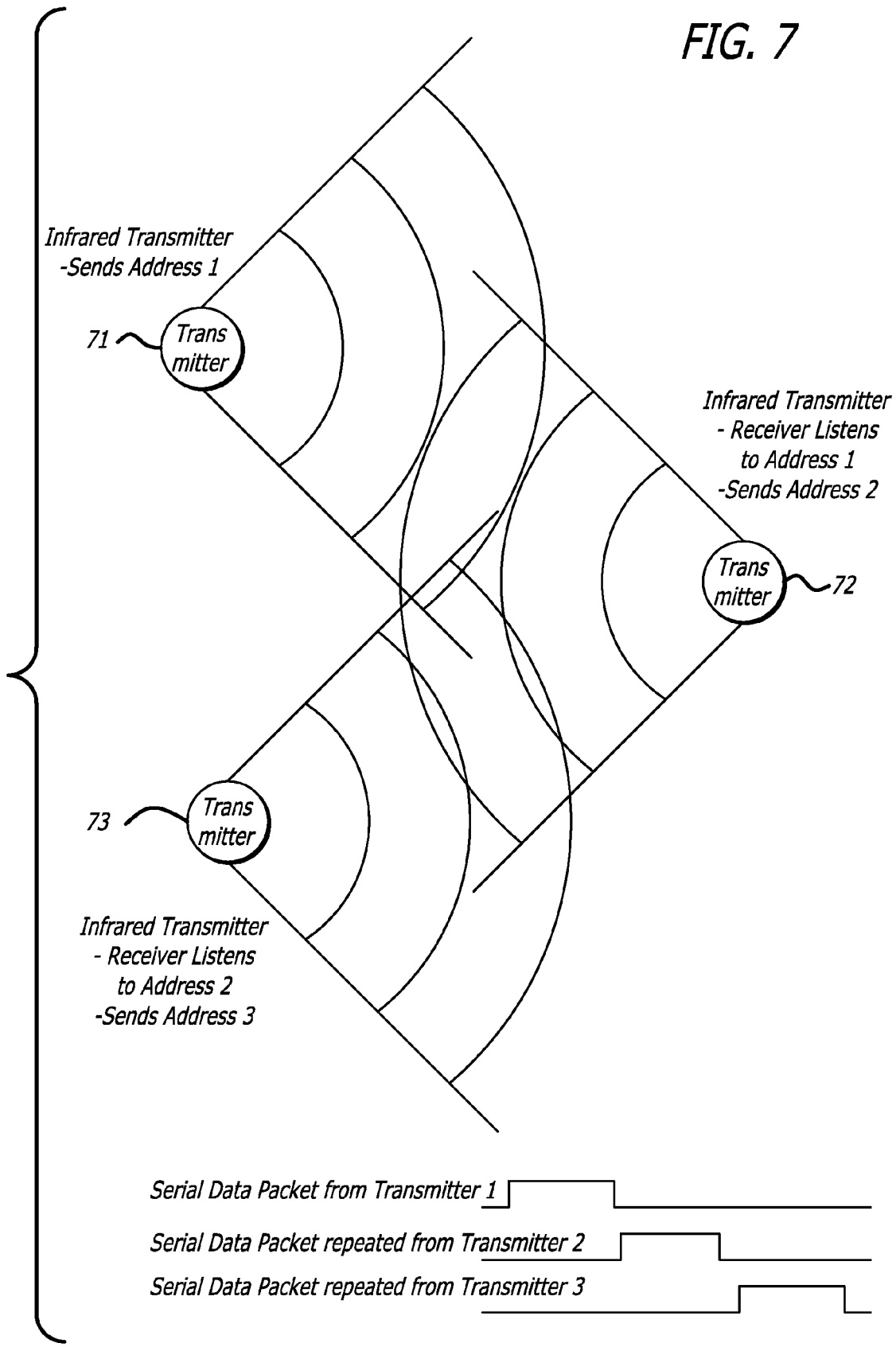
FIG. 7 is a diagram of multiple transmitters set up as repeaters.

FIG. 7 shows an example of two infrared repeaters. A first transmitter 71 and second transmitter 72 are located within range of each other. The first transmitter 71 sends a code that is received by the second transmitter 72. The receiver of the second transmitter 72 is in sight of the first transmitter's 71 infrared output. Second transmitter 72 then sends the same code again. A third transmitter 73, is in turn, located within range of second transmitter 72, but may or may not be within range of the first transmitter. Since third transmitter 73 is in line of sight with second transmitter 72, third transmitter 73 receives and then sends the same code. Overlapping coverage may be avoided by setting needed time delays in transmitters. With time delays, only one transmitter is sending a code at a time. The method of using repeaters allows the coverage area to increase without adding wires between transmitters. This is useful in congested areas such as streets or walkways; it is also minimizes the costs of installations. A similar system of repeaters may be constructed using RF transceivers.

In an exemplary embodiment of the present invention, the wireless transmitter system comprises high intensity infrared emitters, capable of transmitting messages up to 100 feet in bright sunlight. To allow targeted data transmission, visual barriers may confine the infrared signals from the emitters. These emitters are ideal for applications such as transferring data to a handheld device in a localized area, such as a museum display or a scene in a theme park attraction; synchronizing handheld captioning or translation devices with movie images; transferring data from a ride vehicle.

Figure 8A:
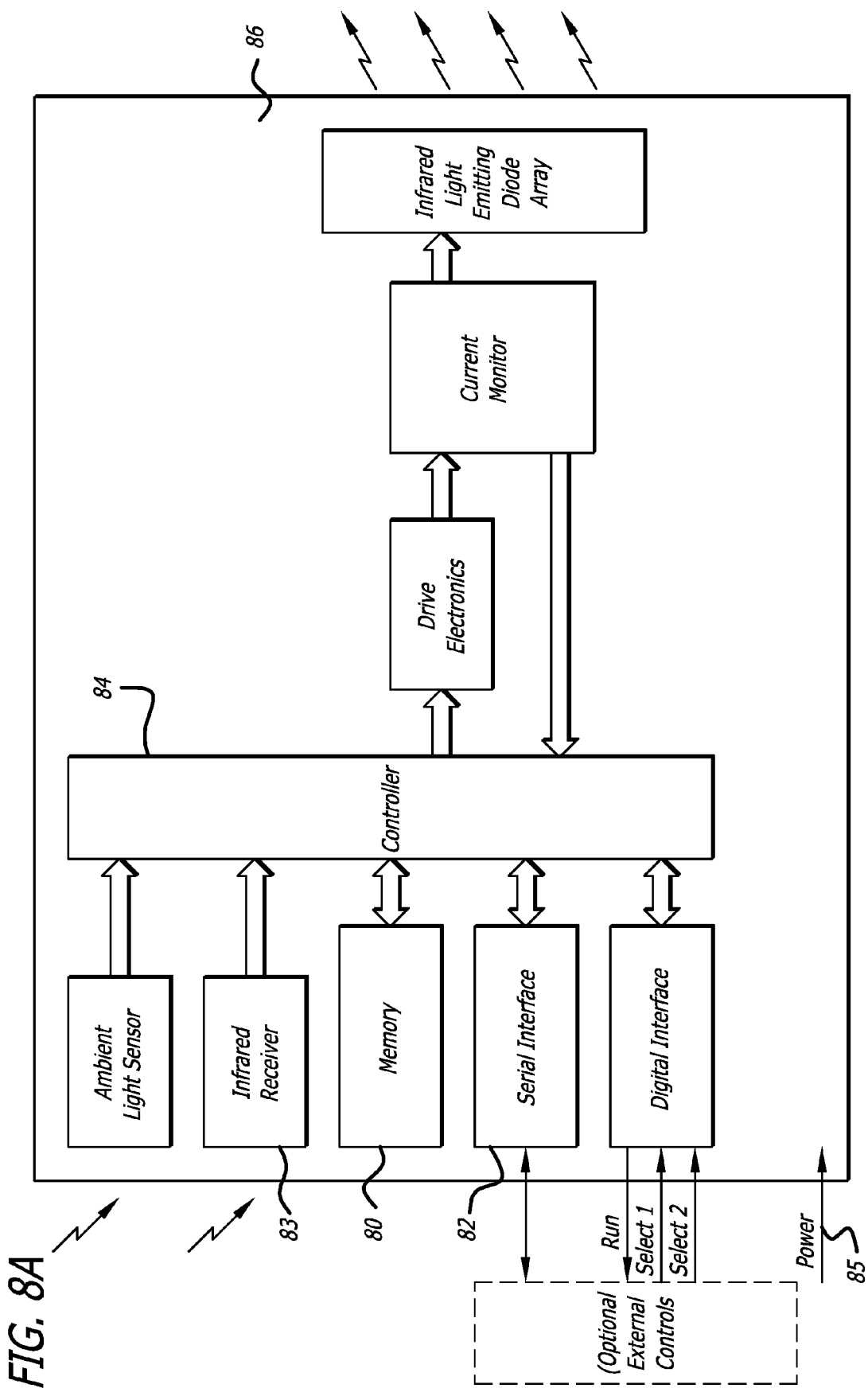
FIG. 8a is a block diagram of an infrared transmitter in accordance with the present invention.
Figure 8B:
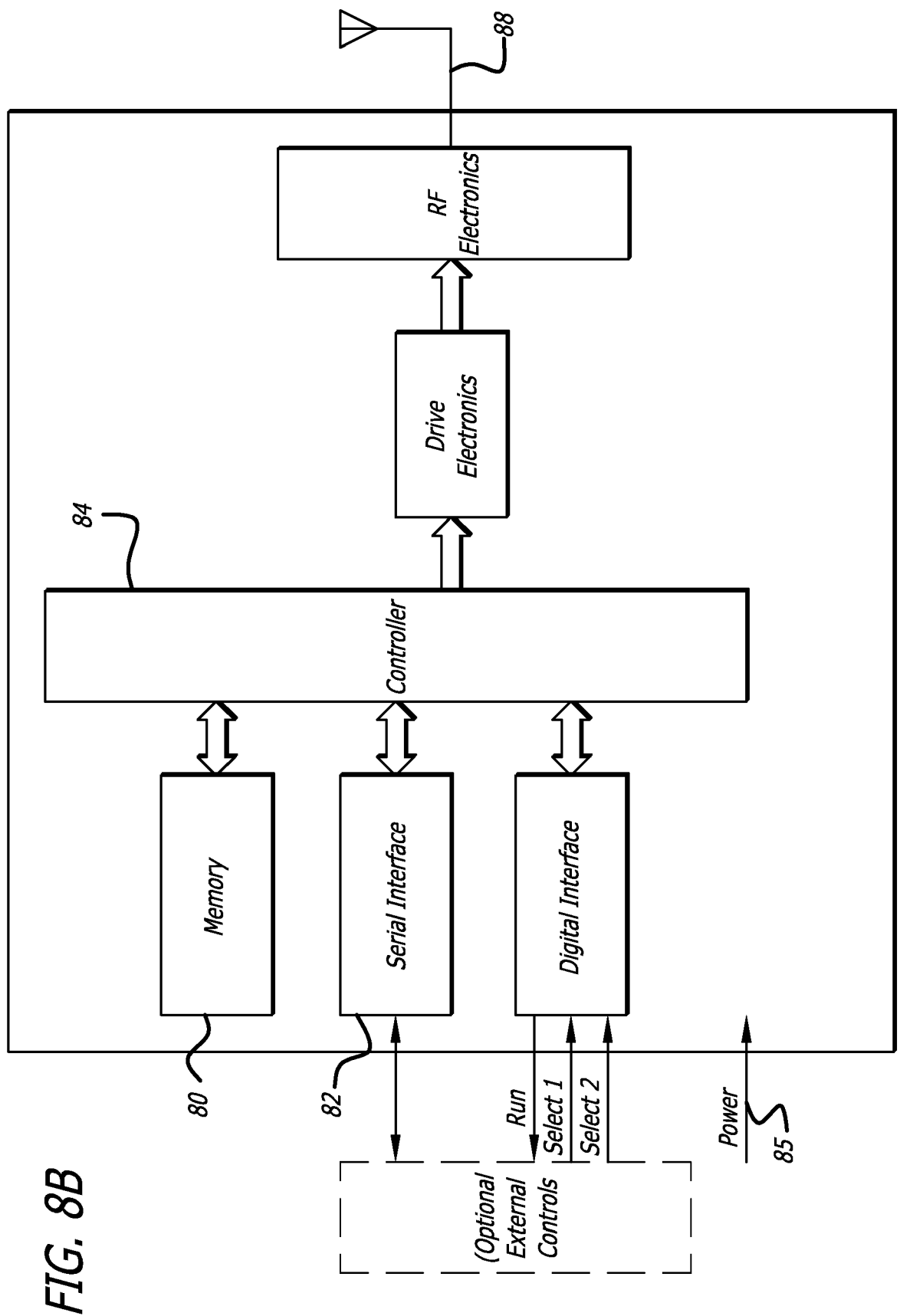
FIG. 8b is a block diagram of a radio frequency transmitter in accordance with the present invention.

Block diagrams of wireless transmitters in accordance with the present invention are illustrated in FIGS. 8a and 8b. The wireless transmitters shown in FIGS. 8a and 8b have the common elements of memory 80, interface 82, controller 84, and power source 85. The infrared transmitter utilizes an array of infrared light emitting diodes 86 (LEDs) to transmit data. The radio frequency transmitter shown in FIG. 8b utilizes an RF antenna 88 to transmit data.

The sizes and shapes of infrared emitters may vary, but all have the common elements of power source, controller, driver electronics, and one or more infrared light sources. In an exemplary embodiment of the present invention, an infrared emitter is housed in a weatherproof enclosure with an infrared filter covering the opening of an infrared LED array, and a connector is provided for electrical connections such as power, serial data communication, and status signals. The controller 84 is connected to high-current LED drive transistors, current-sensing electronics, ambient light sensor, serial interface electronics, non-volatile memory, and an infrared receiver. The controller 84 turns the LED drive transistors on and off at appropriate times to send a serial data packet. LED drive current can be adjusted to vary the emitter power, and therefore emitter range. The ambient light sensor may be used to vary emitter power based on variable interference, such as sunlight during the day. Current through the LED arrays may be monitored to ensure proper function and isolate faulty LED arrays.

As described above, the transmitter memory may be programmed with one or many data packets that the emitter continuously transmits. The memory may also contain configuration data such as emitter address, power setting, frequency of transmission, etc. The controller may receive data via serial interface 82 or the infrared receiver 83. The transmitter memory 80 preferably contains configuration data such as power, transmitted address, repetition rate, assigned address, and repeater delay time. For example, the power of an infrared emitter can be set to one of several different settings. The power can be set at a specific power level from approximately full power, to 10% power.

The transmitted address is generally included in every data packet sent by the transmitter. It may be used as another transmitter's filtering criteria, so that a repeater will only respond to another transmitter with a specific address.

The repetition rate may be used to set the frequency of transmissions when the transmitter operates as a freestanding transmitter. For example, a transmitter could be configured to transmit a data packet from memory 4 times per second.

The assigned address tells a repeater the address of its master. It will check, when receiving data, to assure that the source is that of its master. If the address in the data being received is not that of its master, it is ignored.

Finally, the repeater delay time is used to insert a fixed delay between the received packet and the transmitted packet. This is useful where more than one repeater is being used.

Figure 9:
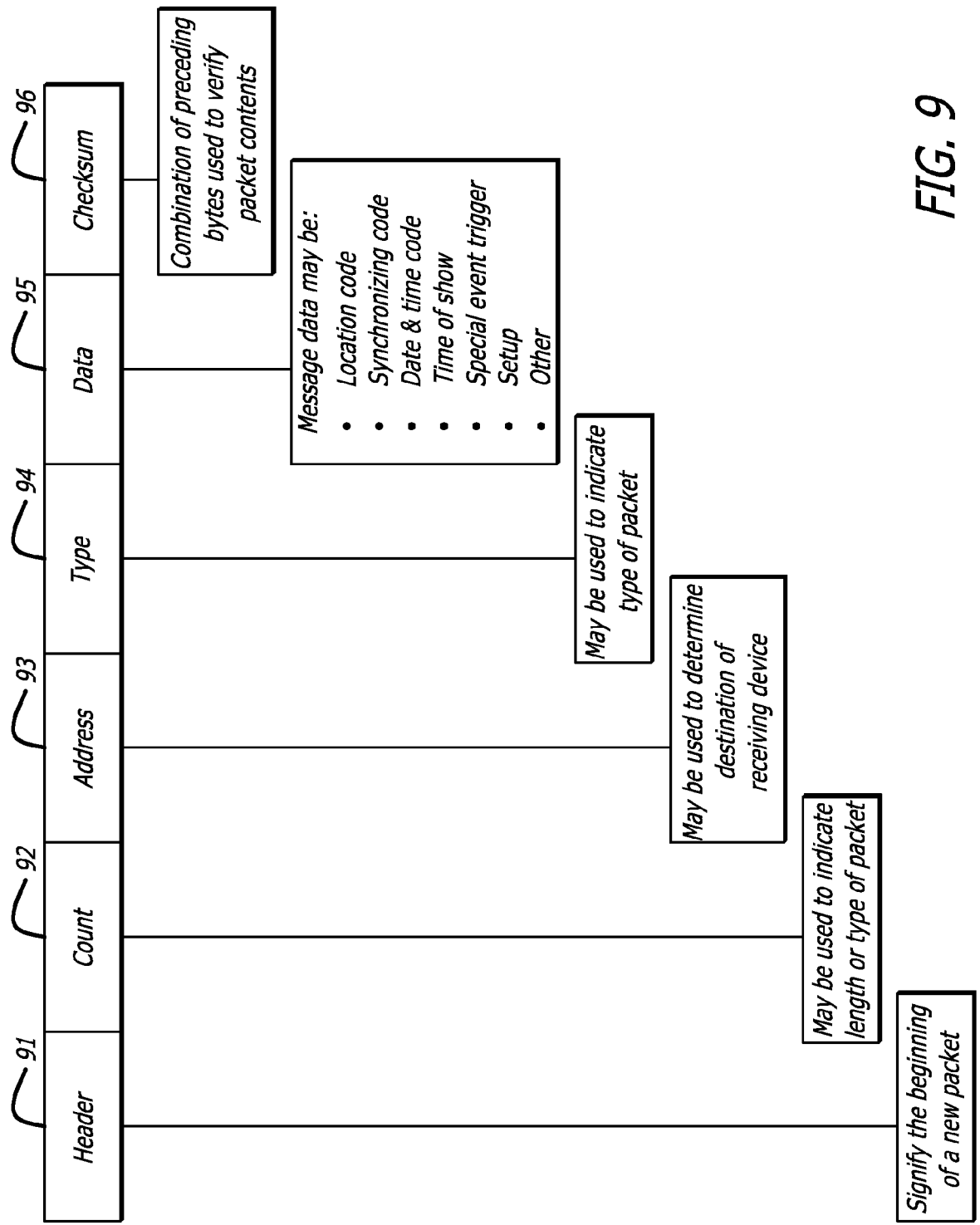
FIG. 9 is a diagram of packet data contents in accordance with the teachings of the present invention.

FIG. 9 illustrates an exemplary embodiment of the basic structure of the data packets, or codes, which are sent by the transmitters. The data packet always starts with a header 91 that signifies the start of a new data packet. The data packet also contains a "count" byte 92 that is used to indicate the length or type of packet.

The address block 93 designates an address for a receiving device. In the case of repeating transmitters, this field is used to designate which transmitter receives the message to act as a repeater. The address field is also used to pinpoint certain devices.

For example, in the scenario described above where multiple transmitters are arranged to act as repeaters, the address field 93 is used to direct the flow of traffic from one transmitter to the next. The address field 93 can also be used to direct certain data for certain types of devices. For example, audio devices would only recognize audio data. Captioning devices would only recognize captioning data.

There may additionally be a field that designates the type of packet. This is indicated by the type field 94. For example, the data packet may strictly be a location-based code. Also the data packet may be a synchronizing or time based code.

In an exemplary embodiment of the present invention, the data format for a location-based code could be as follows. Four numbers may be used to locate a theater geographically. The first number represents the country. The second number represents the state. The third number represents a specific theater. The fourth number represents the screen within the theater venue.

The data field 95 generally contains the code as has been described in accordance with the present invention thus far. The data field 95 may contain location codes, show synchronizing codes, time of day codes, database update information, special effect triggers, etc.

Finally, the checksum 96 uses a combination of all the preceding bytes to verify that the packet has arrived at its location in its entirety.

Figures 1, 10:
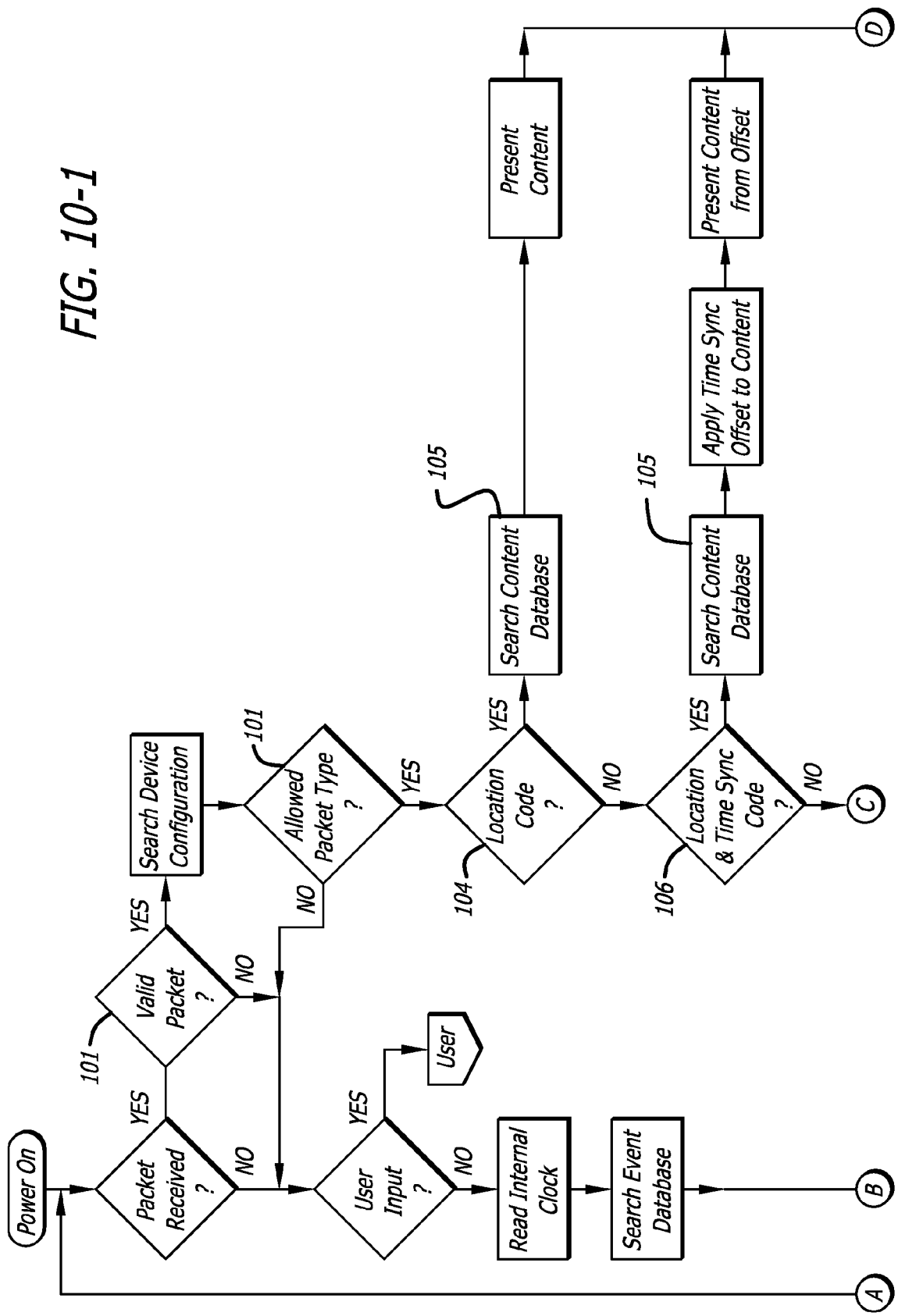
Figures 2, 10:
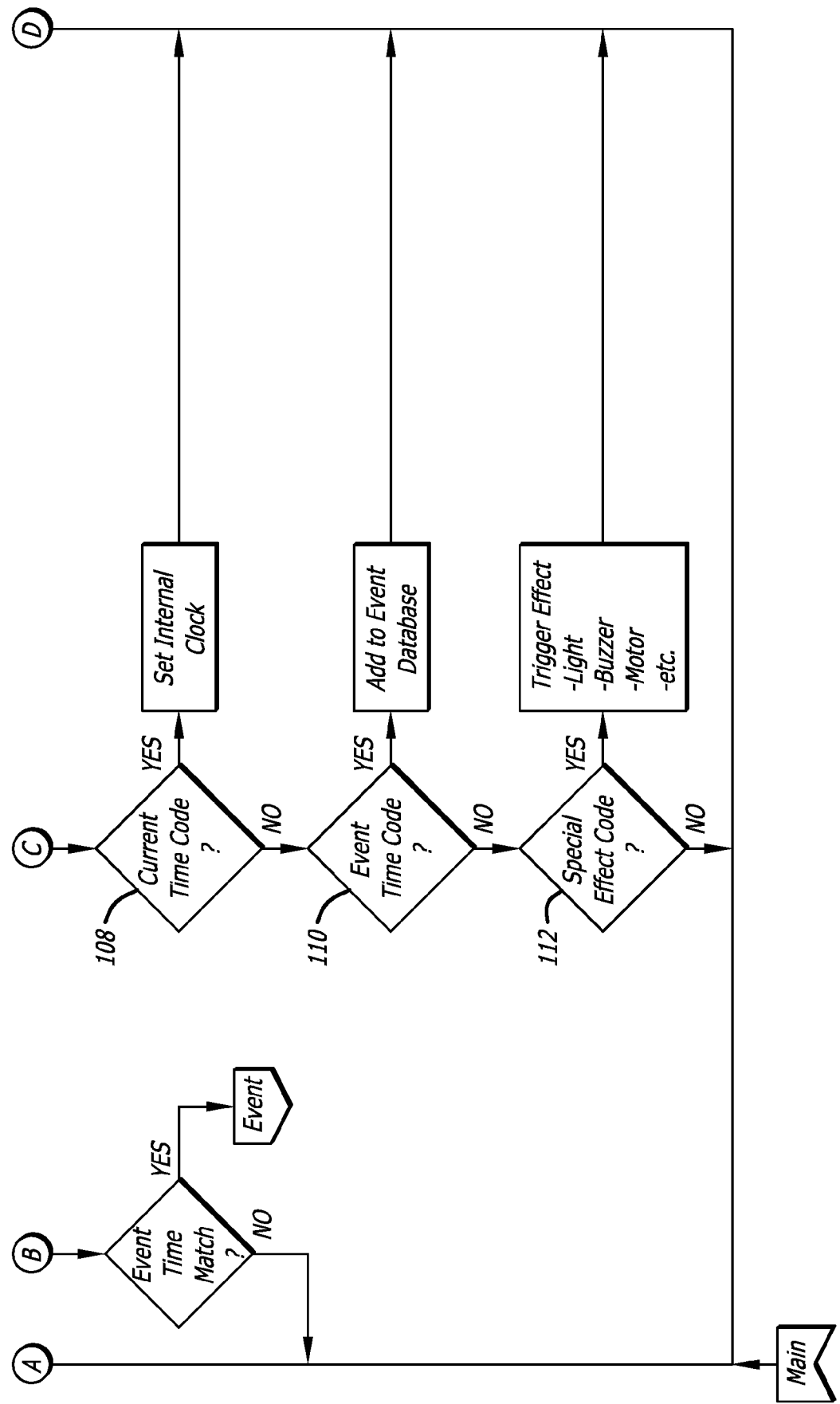
Figures 3, 10:
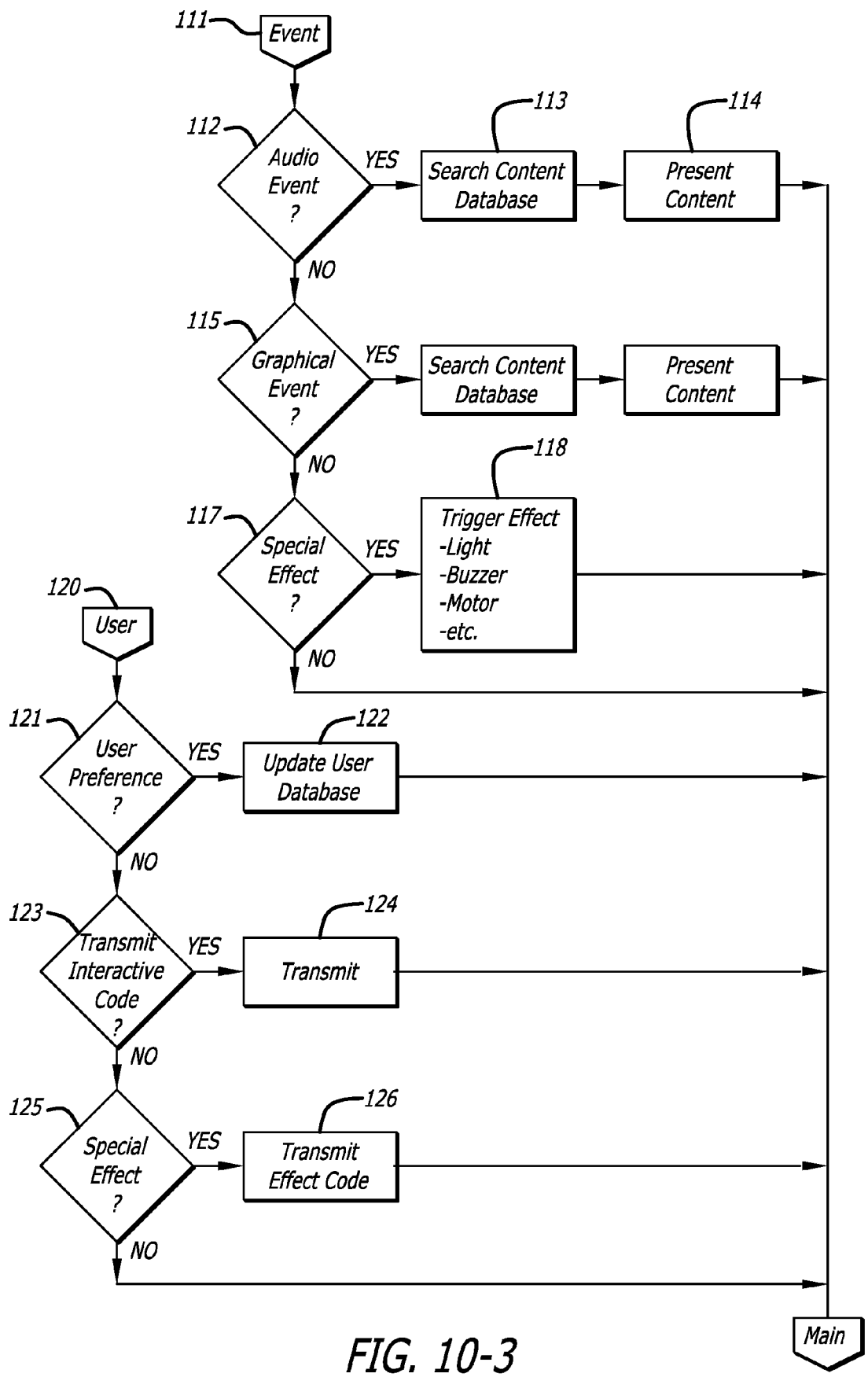

FIGS. 10-1 to 10-3 are a flow diagram that illustrate how data packets are handled by a portable device. When the portable device is powered on, it is capable of receiving data packets. The receiving device first checks to see if the data packet is in valid format as shown at block 101 by verifying its header and calculating its checksum. If the packet is valid, the device then goes on to search its database as shown in blocks 105 for the proper corresponding presentation content already resident in its memory. If the data packet is not in valid format, the device continues to wait for data packets, respond to user input, and match time-based events with its internal clock.

Valid packet data is further analyzed to determine the message type (location code 104, synchronization code 106, effect trigger 112, etc.) Based on the message type, the remaining serial data is used to locate presentation material in the PDA memory. For example, a synchronization serial message received in a theater will contain data specifying the theater location, show playing, and current time in the show. This PDA will search its memory for audio or visual content in that show at the current time, and present the material on its display or through its audio amplifier.

For the example of a portable device receiving a valid synchronizing code, the time offset information from the code will be used to calculate an offset into the presentation data file. So, if a portable audio device is taken into a theater at mid-show, the audio content will begin playback from mid-show.

As shown in FIG. 10-3, different types of data may be handled in different ways depending on the type of data. For example, at an audio event 112 and graphical event 115 are handled quite similarly. The portable device searches its content database, as shown at block 113, and upon locating the appropriate data file, presents the content on the device. A special effect event 117 may immediately trigger a specific effect such as lights, buzzing, or vibrating.

The portable device could also contain some user preferences. In the case of foreign language translation, the specific language for translation could be configured on the device. The device may alternatively contain other types of information that is representative of the guest using the device.

Other applications exist for the present invention. For example, special pins distributed for guests to wear respond to triggers during parades and at attractions and shows. The trigger may be as simple as a display of lights, or a musical chime. By using a large number of transmitters 10 and interface controllers 60 connected to a communications network, all transmitters may be utilized simultaneously. The resulting coverage area may be huge, and all devices may be triggered at once, creating a mass audience event. Typical coverage areas would be stadiums, theme parks, entire parade routes, convention halls, etc.

A handheld device may provide different games associated with various attractions as the visitor walks near the attraction.

In particular embodiments, toys could include IR or RF receivers that respond to triggers located throughout a theme park and provide location based information at each of those venues. For example, a stuffed animal could be triggered to speak or move while carried through different areas of a theme park, acting as a tour guide for a child.

The memory in the portable device may be used to automatically store usage patterns. The stored information may be used to alter a device's presentation, may be used for tracking user preferences, may be used to infer user location and direction, or may be used to identify missing codes and faulty transmitters.

For example, a portable audio device user repeatedly visiting a location may hear different descriptions on visit 2, visit 3, etc. Repeated return visits to one location may infer a high user interest, so the device may present more and more detailed content on each visit.

Information stored in a portable device may be retrieved via its transmitter. The information gathered from many devices may be collected in a database. The database may contain the travel path and times, as well as the history of user requests (via pushbuttons or touch-screen.) The data may be anonymous, and analyzed to determine group behavior, identify popular locations, isolate busy and idle times, etc. A user could also enter personal information such as name, and the extracted data could be used to reconstruct vacation activities, or reminisce about favorite locations.

The data collected in the portable device may be matched against geographical information also stored in the portable device. Analyzing the locations visited and the sequence of the visits could infer a direction of future travel. The portable device could present content that suggested future destinations.

Information gathered from many devices, then collected in a database, may be analyzed for consistency. If a transmitter has failed, many devices would return without any database entry from that transmitter. Database analysis would highlight the absence of that transmitter, and maintenance personnel could be alerted.

In closing it is to be understood that the embodiments of the invention disclosed herein are illustrative of the principals of the invention. Other modifications may be employed which are within the scope of the invention. Accordingly, the present invention is not limited to that precisely as is shown and described in the present specification.

What is claimed is:

1. A method of providing additional audio/video information during a movie to viewers in a theater, comprising:
   providing a viewer of a movie with a portable device, the portable device being pre-programmed with data representing audio/video information related to the movie presentation;
   wirelessly transmitting at least one time code during the movie, the time code being a time from a start of the presentation;
   receiving the at least one time code at the device;
   processing the at least one time code in the device to determine an offset into a presentation data file as to where to start playback of audio/video information; and
   displaying the audio/video information on the device in synchronization with the movie.

2. The method of claim 1 wherein the information related to the movie comprises show time.

3. The method of claim 1 wherein the information related to the movie comprises text.

4. The method of claim 1 wherein the information related to the movie comprises audio.

5. The method of claim 4 wherein the audio is in a foreign language.

6. A method of providing additional audio and/or visual information during a theatrical presentation to viewers in a theater, comprising:
   providing a viewer of a presentation with a portable device, the portable device being pre-programmed with data representing audio and/or visual information related to the theatrical presentation;
   wirelessly transmitting at least one time code during the theatrical presentation, the time code being a time from a part of the presentation;
   receiving the at least one time code at the device;
   processing the at least one time code in the device to determine an offset into a presentation data file as to where to start playback of audio and/or visual information; and
   presenting the audio and/or visual information on the device in synchronization with the presentation.

7. The method of claim 6 wherein the information related to the movie comprises show times.

8. The method of claim 6 further comprising storing audio information in the presentation data file, wherein the act of presenting the audio and/or visual information comprises presenting the audio information.

9. The method of claim 8 wherein the audio is in a foreign language.

10. The method of claim 6 further comprising storing textual information in the presentation data file, wherein the act of presenting the audio and/or visual information comprises presenting the textual information.

11. The method of claim 10 wherein the textual information is in a foreign language.

* * * * *